(12) United States Patent
Zhang et al.

(10) Patent No.: US 11,706,625 B2
(45) Date of Patent: Jul. 18, 2023

(54) MALICIOUS BLACK HOLE NODE DETECTION AND CIRCUMVENTION

(71) Applicant: Cisco Technology, Inc., San Jose, CA (US)

(72) Inventors: Lele Zhang, Shanghai (CN); Yajun Xia, Shanghai (CN); Chuanwei Li, Shanghai (CN); Li Zhao, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 329 days.

(21) Appl. No.: 17/011,792

(22) Filed: Sep. 3, 2020

(65) Prior Publication Data

US 2022/0070672 A1  Mar. 3, 2022

(51) Int. Cl.
*H04W 12/122* (2021.01)
*H04W 4/70* (2018.01)
(Continued)

(52) U.S. Cl.
CPC .......... *H04W 12/122* (2021.01); *G16Y 30/10* (2020.01); *H04L 43/0829* (2013.01);
(Continued)

(58) Field of Classification Search
CPC ..... H04W 12/122; H04W 4/70; H04W 24/08; H04W 64/00; H04W 84/18; H04W 12/63;
(Continued)

(56) References Cited

U.S. PATENT DOCUMENTS 8,370,928 B1\* 2/2013 Motwani ............... H04L 63/101
709/224
2006/0239203 A1\* 10/2006 Talpade .............. H04W 12/122
370/254
(Continued)

FOREIGN PATENT DOCUMENTS

CN 101895889 A 11/2010
CN 103297973 A \* 9/2013 ......... H04L 63/1416
(Continued)

OTHER PUBLICATIONS

Youcef Hammal, Quentin Monnet, Lynda Mokdad, Jalel Ben-Othman, Abdelkarim Abdelli. "Timed automata based modeling and verification of denial of service attacks in wireless sensor networks". Studia Informatica Universalis, Hermann, 2014, 12 (1), pp. 1-46. (Year: 2014).\*
(Continued)

*Primary Examiner* — Farid Homayounmehr
*Assistant Examiner* — Zhimei Zhu
(74) *Attorney, Agent, or Firm* — Lee & Hayes, P.C.

(57) ABSTRACT

A method includes identifying a potentially malicious node using a rating assigned to nodes within the network and decrementing the rating based on detected dropped messages to identify a potentially malicious node. The malicious node is identified based on location information obtained from the nodes within the network and comparable distances from the potentially malicious node. The method further includes ending communications with the malicious node and selecting a new parent node based on a presumption that any of the plurality of nodes other than the malicious node are non-malicious.

18 Claims, 9 Drawing Sheets

(51) Int. Cl.
*G16Y 30/10* (2020.01)
*H04L 9/40* (2022.01)
*H04W 24/08* (2009.01)
*H04W 64/00* (2009.01)
*H04L 43/0829* (2022.01)
*H04L 43/16* (2022.01)
*H04W 84/18* (2009.01)

(52) U.S. Cl.
CPC .......... *H04L 43/16* (2013.01); *H04L 63/1416* (2013.01); *H04W 4/70* (2018.02); *H04W 24/08* (2013.01); *H04W 64/00* (2013.01); *H04L 2463/143* (2013.01); *H04W 84/18* (2013.01)

(58) Field of Classification Search
CPC ... H04W 12/66; G16Y 30/10; H04L 63/1416; H04L 63/1408
See application file for complete search history.

(56) References Cited

U.S. PATENT DOCUMENTS

2018/0054698 A1* 2/2018 Park ................... H04W 8/00
2021/0281986 A1* 9/2021 Zhu ..................... H04L 63/1425

FOREIGN PATENT DOCUMENTS

| CN | 109548030 A | * | 3/2019 | ......... H04L 63/1416 |
| CN | 109756515 A | | 5/2019 | |
| CN | 107404718 B | | 1/2020 | |
| CN | 108040325 B | | 5/2020 | |

OTHER PUBLICATIONS

S. H. Omprakash and M. K. Suthar, "Mitigation Technique for Black hole Attack in Mobile Ad hoc Network," 2020 11th International Conference on Computing, Communication and Networking Technologies (ICCCNT), pp. 1-5, (Year: 2020).*

Latha Tamilselvan et al. "Prevention of Co-operative Black Hole Attack in MANET", 2008, Journal of Networks, vol. 3, No. 5, May 2008, pp. 13-20 (Year: 2008).*
A. Papadimitriou, F. Le Fessant, A. C. Viana and C. Sengul, "Cryptographic protocols to fight sinkhole attacks on tree-based routing in Wireless Sensor Networks," 2009 5th IEEE Workshop on Secure Network Protocols, Princeton, NJ, USA, 2009, pp. 43-48 (Year: 2009).*
Tseng, FH., Chou, LD. & Chao, HC. "A survey of black hole attacks in wireless mobile ad hoc networks". 2011, Human-centric Computing and Information Sciences vol. 1, Article No. 4 (Year: 2011).*
Kibirige, George William and Camilius A. Sanga. "A Survey on Detection of Sinkhole Attack in Wireless Sensor Network." 2015, obtained online from <arxiv.org/ftp/arxiv/papers/1505/1505.01941. pdf>, retrieved on Feb. 16, 2023 (Year: 2015).*
Harsh Kupwade Patil, Thomas M. Chen, "Wireless Sensor Network Security", 2017, in Computerand Information Security Handbook (Third Edition), pp. 317-337 (Year: 2017).*
J. Sebastian Terence and Geethanjali Purushothaman, "A Novel Technique to Detect Malicious Packet Dropping Attacks in Wireless Sensor Networks", Feb. 2019, J Inf Process Syst, vol. 15, No. 1, pp. 203-216 (Year: 2019).*
Patcha et al., "Collaborative Security Architecture for Black Hole Attack Prevention in Mobile AD HOC Networks," ResearchGate, Published Sep. 8, 2003, pp. 75-78.
Xin-sheng et al., "Lightweight Defense Scheme against Selective Forwarding Attacks in Wireless Sensor Networks," ieeexplore.ieee. org, Published Dec. 1, 2009, pp. 226-232.
Ahsan Muhammad Saad et al: "Wormhole attack detection in routing protocol for low power lossy networks", 2017 International Conference On Information and Communication Technologies (ICICT), IEEE, Dec. 30, 2017 (Dec. 30, 2017), pp. 58-67, XP033332460, DOI: 10.1109/ICICT.2017.8320165 [retrieved on Mar. 19, 2018].
International Preliminary Report on Patentability dated Mar. 16, 2023 for PCT Application No. PCT/US2021/047584, 10 pages.
Raza I et al: "Identification of malicious nodes in an AODV pure ad hoc network through guard nodes", Computer Communications, Elsevier Science Publishers BV, Amsterdam, NL, vol. 31, No. 9, Jun. 8, 2008 (Jun. 8, 2008), pp. 1796-1802, XP022668028, ISSN: 0140-3664, DOI: 10.1016/J.COMCOM.2007.11.012 [retrieved on Dec. 3, 2007].

* cited by examiner

MALICIOUS BLACK HOLE NODE DETECTION AND CIRCUMVENTION

TECHNICAL FIELD

The present disclosure relates generally to the Internet of Things (IoT) and wireless mesh networks (WMNs) and wireless sensor networks (WSNs). More specifically, this disclosure relates to detection and circumvention of a black hole attacks from malicious devices within a low-power and lossy network (LLN).

BACKGROUND

In an IoT network, a mesh network (WMN or WSN) including a plurality of nodes may utilize low-power and lossy network (LLN) technologies. An LLN includes a plurality of devices with limited power, memory, and processing resources interconnected by a variety of links, such as, for example, Institute of Electrical and Electronics Engineers (IEEE) 802.15.4 or low-power Wi-Fi. The nodes within an LLN may include a number of sensory devices to sense at least one environmental event at locations where the each of the individual plurality of nodes are located. LLNs may be used in situations including, for example, industrial monitoring, building automation (heating, ventilation, and air conditioning (HVAC), lighting, access control, and fire alarm and suppression systems, among others), connected home, health care, environmental monitoring, urban sensor networks, energy management, assets tracking, refrigeration, electrical lighting, and utility metering, among a myriad of the other situations and use cases.

In some instances, the LLN may be subjected to a denial-of-service attack referred to herein as a "black hole attack." A black hole within a network is a location within the network where incoming and/or outgoing traffic is discarded or "dropped." In most black hole attacks, the data packets transmitted from a sending node to a "black hole node" are discarded by the black hole node without transmitting the data packet to a receiving node within the network as intended or instructed. Both the sending node and the intended node are intentionally not informed by the black hole node that the data packets did not reach the receiving node. In this manner, the black hole node is a data sink that simply disposes of network traffic. Further, a black hole node is logically invisible when examining the topology of, for example, and LLN, and may only be detected by monitoring the lost traffic. Thus, a black hole node may be malicious and pernicious means of effecting a denial-of-service attack on an LLN.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
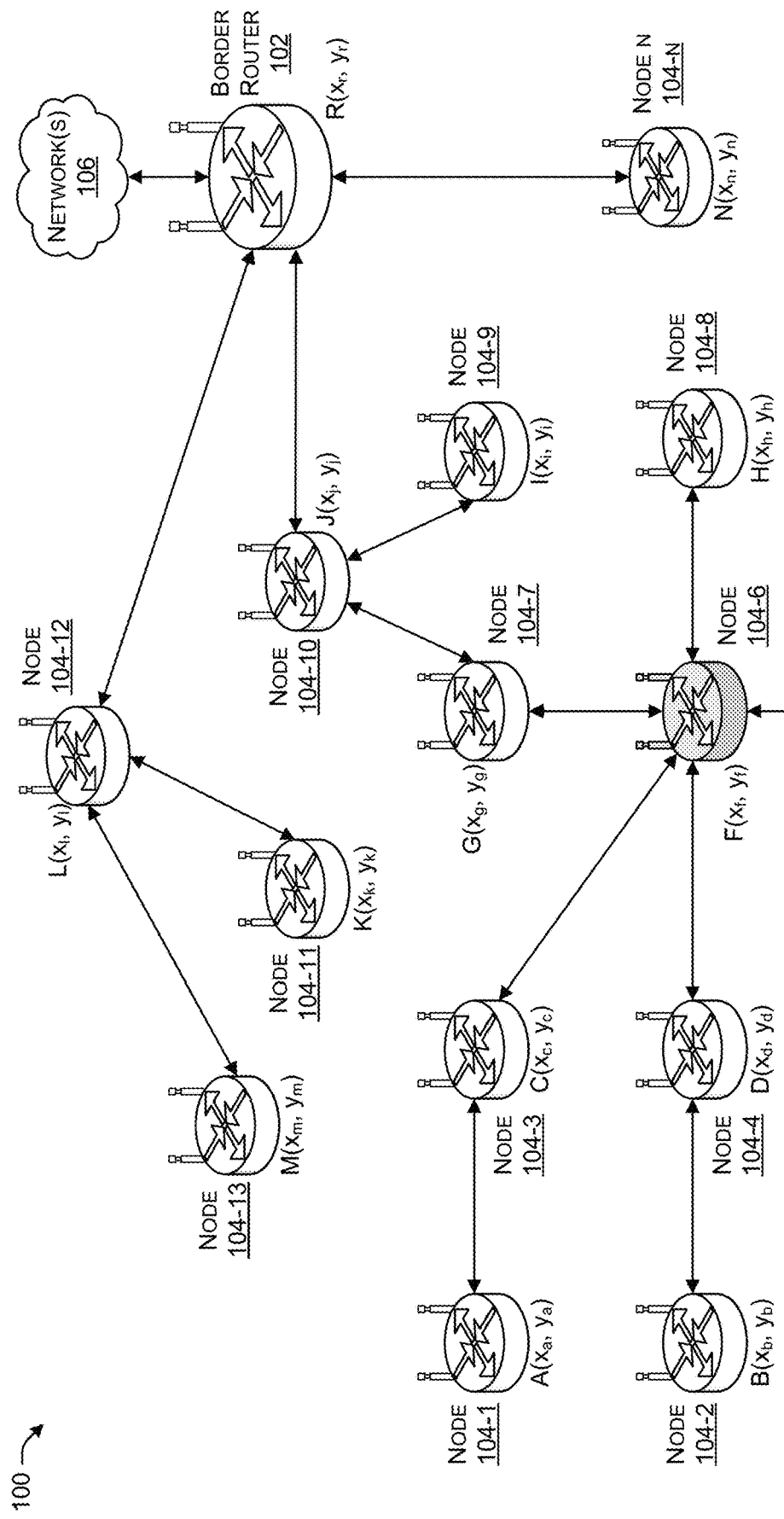
FIG. 1 illustrates a system-architecture diagram of an example wireless sensor network (WSN) that is detecting a malicious node, according to an example of the principles described herein.

This disclosure describes techniques for identifying a malicious node within an WSN or similar network. Further, this disclosure describes techniques for identifying the malicious node as a black hole node. Still further, the techniques described herein include communicatively disassociating one or more nodes from the black hole node in order to eliminate the loss of data packets to the black hole node and, instead, transmit the data packets to an intended receiving node. The purpose of the systems and methods described herein may find a genesis in one or more paradoxes experienced in field deployment of a WSN.

First, a link quality of the data link layer (e.g., Layer 2 of the of the Open System Interconnection (OSI) model as defined by the International Organization of Standardization (ISO)) may be sufficient to transfer data packets between the nodes 104 within the WSN 100, but there may exist an abnormally large amount of upper-layer retransmissions. The expected transmission count (ETX)) may be sufficient in this scenario. The routing protocol for low power and lossy networks (RPL) supports aggregated metrics and the following subset of routing metrics or constraints: (1) routing metrics such as, for example, ETX of the links between nodes 104, the latency of the links between the nodes 104, and a directed acyclic graph (DAG) rank; and (2) routing constraints such as, for example, a node state and attribute (NSA), a node energy of the node 104. The ETX metric may be defined as the number of transmissions a node 104 expects to make to a destination (e.g., another node 104 or the border router 102) in order to successfully deliver a data packet and may be calculated using the formula $$ETX = \frac{1}{(D_f * D_r)}$$

where $D_f$ is the measured probability that a packet is received by the neighbor and $D_r$ is the measured probability that the acknowledgment packet is successfully received. The retransmissions will not be abnormally prolific even if congestion within the network occurs. Based on the RPL, as long as one node 104 has a good link quality and/or routing condition(s), a child node 104 may not adjust its data transmission to a new parent node even if there were a lot of packet drops therebetween. This results in a situation where it is difficult to recover from the black hole attack by the malicious node 104-6 since the malicious node 104-6 continually broadcasts false information when it advertises to the other nodes 104 that its routing metrics are sufficient. For example, in FIG. 1, the malicious node 104-6 may claim (e.g., broadcast information) that it is a first hop node from the border router 102 with a lower personal area network (PAN) cost relative to other nodes 104 in order to attract transmissions from the nodes 104. However, in actuality, the malicious node 104 is at least three hops from the border router 102. If the other nodes 104 including node 104-3, node 104-4, node 104-5, and/or 104-8 were aware of the real positioning location of the malicious node 104-6, these nodes 104 could mode easily identify the malicious node 104-6.

Examples described herein provide a device including one or more processors, and one or more non-transitory computer-readable media storing instructions that, when executed by the one or more processors, cause the one or more processors to perform operations including assigning a first rating to a plurality of nodes within a mesh network, and determining a number of drops of a plurality of messages sent to a first node. The operations further include, based at least in part on a determination that a number of the plurality of messages have been dropped within a time period, decrementing a first rating assigned to the first node, determining whether the first rating assigned to the first node drops below a rating threshold, and based at least in part on a determination that the first rating drops below the rating threshold, indicating that the first node is a potentially malicious node.

The operations further include sending a first request to the first node for first location information of the first node, sending a second request to at least a second node for second location information of at least the second node, receiving the first location information of the first node from the first node, receiving the second location information of at least the second node from at least the second node, determining if a first distance to the first node is larger than a distance threshold defined by a second distance to at least the second node, and based at least in part on a determination that the first distance to the first node is larger than the distance threshold, identifying that the first node is a malicious node.

The operations further include ending communications with the first node, and selecting a parent node from the plurality of nodes other than the first node based on a presumption that any of the plurality of nodes other than the first node are non-malicious. The mesh network is a wireless network, a wireless mesh network, or a wireless sensor network. The operations further include determining if an intermediary node exists within a network route to the first node, and based at least in part on a determination that the intermediary node exists within the network route to the first node, instructing the intermediary node to perform the operations described above. The distance threshold is two times a radius of a wireless communication distance of at least the second node. The operations further include reporting the first node as being the malicious node to at least a third node of the plurality of nodes or a network control device.

Examples described herein provide a method including determining a number of drops of a plurality of messages sent to a first node within a mesh network of a plurality of nodes, and based at least in part on a determination that a number of the plurality of messages have been dropped within a time period, decrementing a first rating assigned to the first node. The method further includes determining whether the first rating assigned to the first node drops below a rating threshold, and based at least in part on a determination that the first rating drops below the rating threshold, indicating that the first node is a potentially malicious node.

The method further includes sending a first request to the first node for first location information of the first node, sending a second request to at least a second node for second location information of at least the second node, receiving the first location information of the first node from the first node, and receiving the second location information of at least the second node from at least the second node. The method may further include determining if a first distance to the first node is larger than a distance threshold defined by a second distance to at least the second node, and, based at least in part on a determination that the first distance to the first node is larger than the distance threshold, identifying that the first node is a malicious node.

The method further includes ending communications with the first node and selecting a parent node from the plurality of nodes other than the first node based on a presumption that any of the plurality of nodes other than the first node are non-malicious. The method further includes determining if an intermediary node exists within a network route to the first node, and, based at least in part on a determination that an intermediary node exists within the network route to the first node, instructing the intermediary node to perform the method described above. The distance threshold is two times a radius of a wireless communication distance of at least the second node.

The method further includes reporting the first node as being the malicious node to at least a third node of the plurality of nodes or a network control device. The first location information and the second location information are determined via at least one of a distance vector-hop (DV-Hop) algorithm, an approximate point in triangulation (APIT) algorithm, or a centroid localization algorithm.

Examples described herein provide a non-transitory computer-readable medium storing instructions that, when executed, cause one or more processors to perform operations, including determining a number of drops of a plurality of messages sent to a first node within a mesh network of a plurality of nodes, and, based at least in part on a determination that a number of the plurality of messages have been dropped within a time period, decrementing a first rating assigned to the first node. The operations further include determining whether the first rating assigned to the first node drops below a rating threshold, and, based at least in part on a determination that the first rating drops below the rating threshold, indicating that the first node is a potentially malicious node. The operations further include sending a first request to the first node for first location information of the first node, sending a second request to at least a second node for second location information of at least the second node, receiving the first location information of the first node from the first node, and receiving the second location information of at least the second node from at least the second node. The method further includes determining if a first distance to the first node is larger than a distance threshold defined by a second distance to at least the second node, and, based at least in part on a determination that the first distance to the first node is larger than the distance threshold, identifying that the first node is a malicious node.

The operations further include assigning a first rating to the plurality of nodes within the mesh network prior to determining the number of drops of the plurality of messages sent to the first node of the plurality of nodes. The operations further include ending communications with the first node and selecting a parent node from the plurality of nodes other than the first node based on a presumption that any of the plurality of nodes other than the first node are non-malicious. The operations further include determining if an intermediary node exists within a network route to the first node, and, based at least in part on a determination that the intermediary node exists within the network route to the first node, instructing the intermediary node to perform the operations described above. The operations further include reporting the first node as being the malicious node to at least a third node of the plurality of nodes or a network control device. The plurality of nodes include sensory devices to sense at least one environmental event at locations where the plurality of nodes are located, and the mesh network includes a low-power and lossy network (LLN).

Additionally, the techniques described in this disclosure may be performed as a method and/or by a system having non-transitory computer-readable media storing computer-executable instructions that, when executed by one or more processors, performs the techniques described above.

Example Embodiments

As discussed above, an LLN may include a plurality of nodes set up as, for example, a mesh network such as a wireless mesh network (WMN) or a wireless sensor network (WSN). The term WSN will be used herein by way of example as a network topology. However, the systems and methods described herein apply to any type of network. Further, the term "mesh network" will be used herein to describe the topology of the network depicted in the figures. However, any type of network topology may be applied in the present systems and methods. As used in the present specification and in the appended claims, the term "mesh network" is meant to be understood broadly as a local network topology in which the infrastructure nodes (i.e. bridges, switches, and other infrastructure devices) connect directly, dynamically and non-hierarchically to any number of other nodes and cooperate with one another to efficiently route data. In some examples, the nodes may be coupled to a plurality of other nodes such that a lack of dependency on one node is achieved allowing for every node to participate in the relay of information. In one example, a given node within the mesh network may be communicatively coupled to single node such that a parent/child relationship may be formed between the two nodes. In one example, the mesh network may be communicatively coupled to a plurality of nodes 104 such that data may be transmitted to either or both nodes. In the examples described herein, the nodes may dynamically self-organize and self-configure providing for a reduction in installation overhead. The ability to self-configure enables dynamic distribution of workloads in the event a few nodes fail, or, in the present context, a malicious node is detected along a communication path between a node and the border router or other ultimate destination node/router. This in turn contributes to fault-tolerance and reduced maintenance costs by allowing a node to remove its dependency from the malicious node and reconfigure itself to transmit data to another node acting as its new parent node. Although the term WSN will be used to describe the topology of the networks described herein in order to provide context to the systems and methods, any network topology that includes mesh network characteristics as described herein may be employed. Further, in one example, the topology of the WSN may include a multi-hop wireless mesh network.

A border router, a gateway router, or another device may be ultimately communicatively coupled to the nodes within the WSN. The border router acts as a bridge between the WSN and another network. This enables data to be stored and processed by devices with more resources relative to the nodes within the WSN, such as, for example, a remotely located server. A wireless wide area network used primarily for low-power devices may be referred to as a low-power wide-area network (LPWAN). Thus, the WSN described herein may also include one or mode characteristics of a low-power and lossy network (LLN).

As used in the present specification and in the appended claims, the "term low-power and lossy network (LLN)" is meant to be understood broadly as any type of network in which both the routers (e.g., nodes) and their interconnect are constrained. Nodes within an LLN such as those nodes described herein may operate with constraints on processing power, memory, and energy (e.g., battery power). The nodes' interconnects may be characterized by high loss rates, low data rates, and instability. LLNs are comprised of anything from a few dozen to thousands of sensors/routers. Supported traffic flows include point-to-point (between devices inside the LLN), point-to-multipoint (from a central control point to a subset of devices inside the LLN), and multipoint-to-point (from devices inside the LLN towards a central control point). The present systems and methods described herein may utilize the IPv6 Routing Protocol for Low-Power and Lossy Networks (RPL). RPL provides a mechanism whereby multipoint-to-point traffic from devices inside the LLN towards a central control point as well as point-to-multipoint traffic from the central control point to the devices inside the LLN are supported. Support for point-to-point traffic is also available.

The nodes within the WSN may be spatially distributed autonomous sensors to monitor physical or environmental conditions, such as temperature, sound, and pressure, among a myriad of other environmental conditions. The nodes within the WSN cooperatively pass their data through the network to a main location including the border router. In one example, the WSN may be bi-directional, allowing for enabling control of sensor activity. A WSN may be used in a myriad of use cases and situations including, for example, battlefield surveillance; industrial process monitoring and control, machine health monitoring, geo-fencing of autonomous and semi-autonomous utilities and machinery, implanted, wearable, and environment-embedded medical devices (e.g., body-area network), air pollution monitoring, forest fire detection, landslide detection, water quality monitoring, natural disaster monitoring and prevention, and so on.

As in most network types, a WSN may be subjected to a denial-of-service attack. One such denial-of-service attack that the WSN may be subjected to is a black hole attack as described above. The detection and correction of such an attack may occur when a malicious node is placed within a communication distance from any one of the legitimate nodes within the WSN or when one of the original nodes within the WSN is compromised as to its security and is used as the malicious node.

The malicious node has access to the WSN by, for example, utilizing a stolen key such as a group temporal key (GTK). Once the key allows a malicious user to gain access to the malicious node, the user may instruct the malicious node to broadcast to one or more legitimate nodes within the WSN and advertises itself as a preferred parent node with high link quality (e.g., low package drop rates), a good routing cost (e.g., it is topologically and/or physically close to a border router, a sink node, a root node, etc.), and a low latency, among other efficiencies within the WSN related to the transmission of data within the WSN. Thus, if a malicious user may cause many nodes to accept the malicious node as a parent node and send their network traffic to the malicious node. Thus, an objective of the present systems and methods described herein is to detect and circumvent (or otherwise render inoperable or inconsequential) a malicious node within the WSN.

Certain implementations and examples of the disclosure will now be described more fully below with reference to the accompanying figures, in which various aspects are shown. However, the various aspects may be implemented in many different forms and should not be construed as limited to the implementations set forth herein. For instance, while several of the exemplary figures are illustrated as showing a WSN or LLN, it is contemplated that the techniques described herein are applicable to other types of network topologies and communication protocols. The disclosure encompasses variations of the examples, as described herein. Like numbers refer to like elements throughout.

FIG. 1 illustrates a system-architecture diagram of an example wireless sensor network (WSN) 100 that is detecting a malicious node 104-6, according to an example of the principles described herein. The WSN 100 may include any number of nodes 104-1, 104-2, 104-3, 104-4, 104-5, 104-6, 104-7, 104-8, 104-9, 104-10, 104-11, 104-12, 104-13, 104-N where N is any integer greater than or equal to 1 (collectively referred to herein as node(s) 104 unless specifically addressed otherwise). The nodes 104 may include, for example, any devoice capable of monitoring and recording any physical condition(s) of the environment and store and/or transmit that collected data to a central location such as a border router 102. As described herein, the nodes 104 may measure environmental conditions such as, for example, temperature, sound, pollution levels, humidity, wind, among a myriad of other environmental characteristics in a myriad of applications. In one example, the nodes 104 communicate with one another via a wireless communications technology. This wireless communications technology may include, for example, IEEE 802.15.1 standardized wireless communications commonly referred to as Bluetooth® wireless technology standards (including Bluetooth® Low Energy (BLE) standards), near-field communication (NFC) technology standards, any of IEEE 802.11a, b, g, n, ac, ax standards commonly referred to as Wi-Fi™, cellular data services standards, low-power wide-area network (LPWAN) communication standards, IPv6 over Low-Power Wireless Personal Area Networks (6LoWPAN) communication standards, other wireless communications technologies, and combinations thereof.

The nodes 104 may be spatially dispersed within a physical area serviced by the WSN 100 such that each node 104 is able to detect the environmental characteristic(s) in its own area within the WSN 100. Each node 104 may include a radio transceiver with an internal antenna or connection to an external antenna to communicate with at least one other node 104 and/or the border router 102 within the WSN 100. Each node 104 may also include a processing device such as a microcontroller, and electronic circuitry to provide for storing data, and transmitting data to the other nodes 104. The nodes 104 may also include an energy source, such as, for example, a battery or an embedded form of energy harvesting (e.g., a photovoltaic device). As the functions, sizes, and costs of the nodes 104 vary, so does the constraints on resources such as energy, memory, computational speed, and communications bandwidth of the nodes 104.

A border router 102 may be included within the WSN 100 and be ultimately communicatively coupled to the nodes within the WSN 100. The border router 102 acts as a bridge between the WSN 100 and a number of other network(s) 106. Thus, data collected by the nodes 104 may be directed to the border router 102, and the border router 102 may send that data onto another device within the WSN 100 such as, for example, a remotely located server. This enables the collected data to be stored and processed by devices with more resources relative to the nodes 104 within the WSN 100 and allows for the ultimate data processing sought after by the user. In one example, the border router 102 may be any router that may function within an IoT network. In one example, the border router 102 may be an Internet protocol version 6 (IPv6)-based low-power personal area network (6LoWPAN) router compatible with the IEEE 802.15.4 standard. In one example, the IP does not calculate routes, and calculation of routes is performed by a routing protocol to maintain routing tables in the routers. The 6LowPAN router may utilize an adaptation layer between the network (e.g., IPv6) and data link layer (e.g., IEEE 802.15.4 MAC) to fragment and reassemble IPv6 packets.

Node 104-6 in the examples described herein is the malicious node identified by the other nodes 104 as being the malicious node and is indicated as such by the greyscale applied to node 104-6. Node 104-6 may be referred to herein as malicious node 104-6. Although the malicious node 104-6 is referred to as the malicious node 104-6 throughout this description, initially, the nodes 104 within the WSN 100 are unaware that the malicious node 104-6 is, in fact, a malicious, black hole node. Via application of the techniques described herein, the nodes 104 may identify the malicious node 104-6 as being a black hole node and may take action to circumvent the malicious node 104-6.

The malicious node 104-6 may be any device that is compromised by a malicious user to cause the node 104-6 to perform a black hole attack within the WSN 100. Thus, malicious node 104-6 may be referred to as a black hole node. In one example, malicious node 104-6 may have been subjected to a hack using a stolen key (e.g., a group temporal key (GTK)) by an individual that seeks to maliciously execute the black hole attack on the WSN 100. In this example, the malicious individual may reprogram node 104-6 to cause data packets transmitted from other nodes 104 to malicious node 104-6 to be dropped without transmitting the data packets onto the intended device such as the border router 102. In another example, malicious node 104-6 may be a device introduced into the WSN 100 by the malicious individual using the stolen key. Irrespective of the manner in which the malicious node 104-6 is introduced within the WSN 100, the present systems and methods seek to identify the malicious node 104-6 and circumvent (or otherwise render inoperable or inconsequential) the malicious node 104-6 within the WSN 100 in order to allow the data packets to reach the border router 102 via the other, non-compromised nodes 104.

The detection and the circumvention of the malicious node 104-6 within the WSN 100 will now be described in connection with FIGS. 1-4. Beginning in FIG. 1, and by way of example, node 104-4 and node 104-5 may seek to send data packets representing the physical or environmental conditions collected by the nodes 104 within the WSN 100 to the border router 102. In order to cause many nodes 104 within the WSN 100 to accept the malicious node 104-6 as a parent node and send their network traffic to the malicious node 104-6, the malicious node 104-6 may advertise itself as a preferred parent node. For example, the malicious node 104-6 may advertise that it has with high link quality such as having low package drop rates. Further, the malicious node 104-6 may advertise that it has a good routing cost such as, for example, being topologically close to the border router 102 (the border router being the ultimate destination for the data packets), being relatively close to the border router 102 by way of the number of hops to the border router 102, and/or being physically close to the border router 102. Still further, the malicious node 104-6 may advertise that it has a low latency. The malicious node 104-6 may advertise other efficiencies within the WSN related to the transmission of data packets within the WSN whether the malicious node 104-6 is capable of achieving these efficiencies or not. Because the malicious node 104-6 may advertise in this manner, a malicious user may cause many nodes 104 to accept the malicious node 104-6 as a parent node and send their network traffic to the malicious node 104-6.

In the example of FIG. 1, node 104-3, 104-4, node 104-5, and node 104-8 have accepted the malicious node 104-6 as their parent node. Further, node 104-1 and node 104-2 are grandchild nodes with respect to the malicious node 104-6 as they are communicatively coupled to node 104-3 and node 104-4 respectively. In this manner, the malicious node 104-6, functioning as a black hole node, is able to drop data packets transmitted from several nodes 104 within the WSN 100 including child and grandchild nodes. Although only child and grandchild nodes are depicted in FIG. 1 as utilizing the malicious node 104-6 to transmit data packets, any number of nodes 104 may exist between a leaf node (e.g., a node 104 within the WSN 100 without a child node) and the malicious node 104-6.

Detection of the Malicious Node:

A node 104 within the WSN 100 may detect the presence of the malicious node 104-6 by assigning a highest possible rating to a plurality of nodes 104 within the mesh network (e.g., the WSN 100) and determining a number of drops of a plurality of messages sent to a first node. The first node may be the malicious node 104-6 or an intervening node when viewed from the perspective of a grandchild node. Based at least in part on a determination that a number of the plurality of messages have been dropped within a time period, the first rating assigned to the first node may be dropped or reduced. Further, the nodes 104 determine whether the first rating assigned to the first node drops below a rating threshold, and, based at least in part on a determination that the first rating drops below the rating threshold, indicate that the first node is a potentially malicious node.

Throughout the present description, the nodes 104 (apart from the malicious node 104-6) act individually and are individually responsible for identifying and circumventing a malicious node 104-6. Thus, in the examples described herein, any given node 104 other than the malicious node 104-6 may perform/execute the methods described herein unilaterally and without receiving instructions from a device such as a control node or other processing device within the WSN 100. In one example, the individual nodes 104 perform the techniques described herein by executing onboard software and/or firmware. This ensures that no other node or device in the WSN 100 can be used to influence the nodes 104 in their attempt to identify and circumvent the malicious node 104-6. This allows a level of autonomy to be made available to the nodes 104. In the example of FIGS. 1 through 6, node 104-1, node 104-2, node 104-3, 104-4, node 104-5, and/or node 104-8 may be included as nodes that are performing the detection and circumvention of the malicious node 104-6. The node 104 executing the detection and circumvention techniques described herein may be referred to as the detecting node 104.

As to assigning a highest possible rating to a plurality of nodes 104 within the mesh network (e.g., the WSN 100), a detecting node 104 may individually assign all other nodes within the WSN 100 including the malicious node 104-6 with a highest rating or score. In one example, the highest score may include a highest value within a point system utilized by the detecting node 104 such as, for example, 100 points out of 100 available points. In one example, the highest score may include a value of 100% within a percentage system utilized by the detecting node 104. In any example, the purpose of a detecting node 104 assigning each of the other nodes 104 within the WSN 100 a highest possible rating or score is to allow the detecting node 104 to assume that all other nodes 104 are not malicious until proven to be malicious. Within a WSN 100, the vast majority of nodes 104 may be assumed to be non-malicious, not compromised and are trustworthy and reliable given the idea that there exists a very large number of nodes 104 within the WSN 100 (e.g., hundreds or thousands of nodes 104) and it is highly unlikely that more than a few of the nodes 104 have been compromised (if at all). For example, it may be assumed that a single node may be determined to be malicious in a thousand nodes (e.g., 0.1% of all nodes 104). It is the objective of each node 104 to determine whether a parent node or a node upstream towards the border router 102 is a malicious node such as node 104-6. Thus, any node 104 (apart from the malicious node 104-6) may be a detecting node 104 and may individually perform the methods described herein.

The detecting node 104 may determine a number of drops of a plurality of messages sent from the detecting node 104 to the malicious node 104-6 in order to detect the malicious node 104-6 as a black hole device. For example, during communications between the detecting node 104 and the malicious node 104-6, the detecting node 104 may send a dual layer message comprising a layer 2 (L2) portion and a layer 3 (L3) portion. The L2 portion may include a medium access control (MAC) protocol message that defines, among other data, an address of a destination within the WSN 100 (e.g., the malicious node 104-6 and/or the border router 102). The L3 portion may include the data packet and data defining an address of the border router 102.

The malicious node 104-6 may send a L2 acknowledgement (ACK) message to the detecting node 104 to indicate to the detecting node 104 that the malicious node received the message from the detecting node 104. In this manner, the malicious node 104-6 causes the detecting node 104 to believe that the malicious node 104-6 received the data packet and processed the data packet accordingly including sending the data packet upstream to the border router 102. In actuality, the malicious node 104-6, performing the black hole attack, discards the data packet without transmitting the data packet onto the border router 102.

However, the malicious node 104-6 cannot send an L3 ACK since the L3 ACK message comes from the border router 102. Further, the border router 102 does not send an L3 ACK since it never receives the data packet sent by the detecting node 104 from the malicious node 104-6. Thus, the detecting node 104 will never receive an L3 ACK message in response to sending out a data packet upstream. In instances where the detecting node 104 does not receive an L3 ACK, the detecting node 104 may identify such a deficiency as indicating that the malicious node 104-6 is located between the detecting node 104 and the border router 102. Noted here is the fact that the malicious node 104-6 may be one or more hops from the detecting node 104 such that the detecting node 104 is a child, grandchild, etc. of the malicious node 104-6.

Based at least in part on the detecting node 104 detecting an instance where an L3 ACK message is not received, the detecting node 104 may determine such an instance is the result of a node upstream such as the malicious node 104-6 and/or any intervening nodes 104 having dropped the data packet, and may decrement the highest possible rating to a relatively lower rating (e.g., less than 100% or less than 100 points). For example, once the detecting node 104 detects a first instance of a dropped message, the detecting node 104 may decrement the rating to 99 out of 100, and any subsequent instance may decrement the rating by one point. However, the examples described herein may follow any rating decrease schedule in decrementing the rating.

In one example, the rating may be based on a number of data packet drops over a period of time. In this example, the detecting node 104 may determine if a predefined number of packet drops are detected within the period of time. If the predefined number of packet drops occurs over the period of time, then the detecting node 104 may decrement the rating.

Further, in one example, the detecting node 104 may perform the detection process described above periodically throughout operation. In this example, the detecting node 104 may utilize a timer to determine when the detecting node 104 executes the detection process to detect the dropping of the data packets.

The detecting node 104 may then determine whether the rating drops below a rating threshold. The rating threshold may be predetermined or user-defined. Based at least in part on a determination that the rating is not below the rating threshold, the detecting node 104 may return back to identifying drops of data packets and decrementing the rating as described above. Based at least in part on a determination that the rating has dropped below the rating threshold, the detecting node 104 may indicate that the malicious node 104-6 as being a potential malicious node.

Turning specifically to an instance where a grandchild node of the malicious node 104-6 is performing the detection process described above, the process executed by node 104-2 (a grandchild node of malicious node 104-6 and a child node of node of 104-4) may be exemplary. When node 104-2 performs the detection process described above, it will determine either (1) that node 104-4 is not a malicious node; or (2) that a malicious node 104-6 exists somewhere upstream from node 104-4, and this determination is made based on the same reasons node 104-4 knows that the malicious node 104-6 exists upstream. Node 104-2 may relay an identification message to node 104-4 indicating that node 104-2 believes node 104-4 is a malicious node. Node 104-4 may receive the identification message from node 104-2 and receipt of the identification message may trigger node 104-4 to perform its own malicious node detection process as to nodes upstream from node 104-4 including as to the malicious node 104-6. In this manner, the detection of the malicious node 104-6 may be moved iteratively closer to the actual source of the malicious packet dropping.

Figure 2:
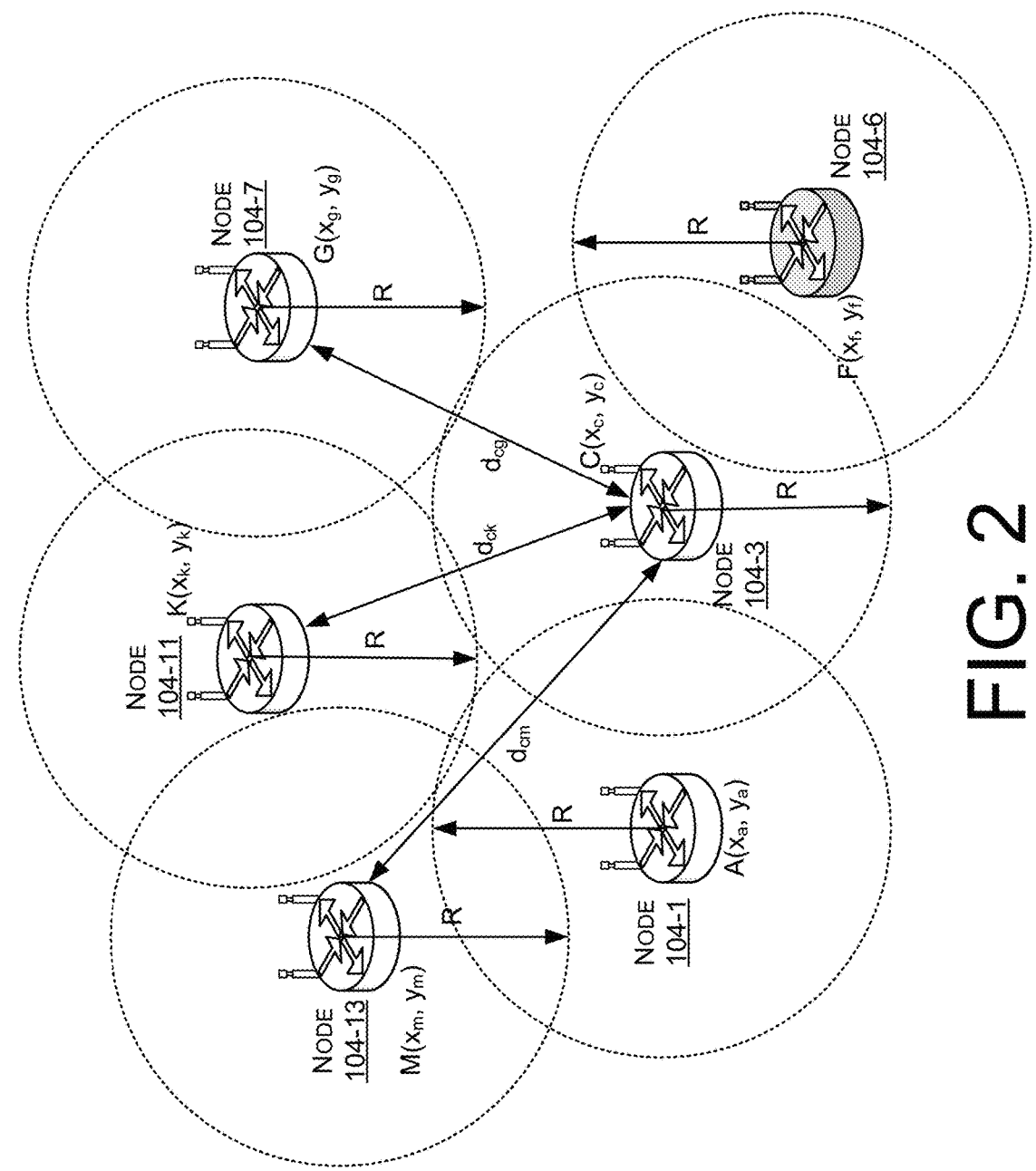
FIG. 2 illustrates a system-architecture diagram of an example WSN that is detecting a malicious node, according to an example of the principles described herein.

Identification of the Malicious Node:

Once the detecting node 104 has detected the malicious node 104-6 as a potential malicious node, a process may be executed by the detecting node 104 to determine whether the malicious node 104-6 is actually malicious (e.g., is a black hole node). Thus, the detecting node 104 performs a preliminary detection operation where the dropped data packets are detected as outlined above, as well as a secondary identification operation to distinctly identify the malicious node 104-6. FIG. 2 illustrates a system-architecture diagram 200 of an example WSN that is detecting a malicious node, according to an example of the principles described herein. In order to specifically identify the malicious node 104-6, the detecting node 104 may request the potentially malicious node (e.g., malicious node 104-6) for location information relative to the detecting node 104. In the examples described herein, node 104-2 may request location information of node 104-4, and node 104-4 may request location information of the malicious node 104-6. The location information may include, for example, Cartesian coordinates as its location in the WSN 100. As depicted in FIGS. 1 through 4, the Cartesian coordinates may take the form of $(x_x, y_y)$ associated with each node and labeled A coordinates through N for nodes 104-1 through 104-N, respectively. In the examples, of node 104-2, node 104-4, and malicious node 104-6, the coordinates may be $B(x_b, y_b)$, $D(x_d, y_d)$, and $F(x_f, y_f)$, respectively. Similar coordinates may be determined for the remainder of the nodes 104 as described herein. In order to determine these coordinates, a number of algorithms may be executed by the detecting node 104 including, for example, a distance vector-hop (DV-Hop) algorithm, an approximate point in triangulation (APIT) algorithm, a centroid algorithm, other algorithms, and combinations thereof.

A DV-Hop algorithm may be any algorithm that determines a best route for data packets within the WSN 100 based on distance. Distance-vector routing protocols utilized by the DV-Hop algorithm measure a distance between a detecting node 104 and another target node such as the malicious node 104-6, the border router 102, and/or any other node 104 within the WSN 100 by the number of nodes the data packet passes to get tot eh target node where one node counts as one hop. In one example, the nodes 104 within the WSN 100 may exchange information with one another in the form of, for example, a routing table including hop counts and possibly other traffic information. The distance-vector routing protocols may utilize, for example, the Bellman-Ford algorithm and/or the Ford-Fulkerson algorithm to calculate the best route within the WSN 100. The term "distance vector" refers to the fact that the protocol manipulates vectors (arrays) of distances to other nodes in the network. Nodes 104 that use distance-vector routing protocol determine the distance between themselves and a destination and may present such distance measurements in the form of $(x_x, y_y)$ as described above and indicated in FIG. 1. For example, the DV-Hop algorithm may translate the detected number of hops in a multi-hop link into a distance in, for example, meters, by means of a correcting factor that is propagated through the network by the nodes, Suppose that N-number of nodes 104 are available and that the nodes 104 have a perfect knowledge of their own position and of the position of all other nodes 104 in the network such that they may calculate al the true Euclidian distances between each other. Then, if the i-th and the j-th node establish a communication path via the multi-hop link, they will be able to relate the number of hops $M_{ij}$ in the route to the actual distance $d_{ij}$ between them to find a correcting factor that corresponds tot eh number of meters per hop as follows:

$$CHOP_{ij} = \frac{d_{ij}}{M_{ij}} = \frac{\sqrt{(x_i - x_j)^2 + (y_i - y_j)^2}}{M_{ij}} \qquad \text{Eq. 1}$$

If every node 104 in the WSN 100 establishes a multi-hop link with all other node 104 (or a subset of them), an overall average correction factor may be obtained and broadcast to all the nodes 104 in the WSN 100.

In one example, the APIT algorithm may be utilized to determine the coordinates of the nodes 104 within the WSN 100. The APIT algorithm is a non-localized iterative algorithm that uses beacon transmissions from the nodes 104. The APIT algorithm utilizes an area-based approach to perform location estimation by isolating the environment into triangular regions between the nodes 104. A node's presence inside or outside the triangular regions allows the node to narrow down the area in which it can potentially reside. By using combinations of positions of the nodes 104, the diameter of the estimated area in which the node 104 resides can be reduced to provide accurate location estimates. This point-in-triangulation (PIT) test utilized by the APIT algorithm may be repeated within different triplet sets of nodes 104 until all combinations are exhausted or a requested accuracy has been reached. The APIT algorithm may calculate a center of gravity (CoG) of the intersection of all the triangles in which a node 104 resides to determine its estimated position.

In one example, the centroid algorithm may be utilized to determine the coordinates of the nodes 104 within the WSN 100. The centroid algorithm does not use any type of signal measurement to infer range or angle of arrival (AoA) information between nodes 104. For example, for the detecting node 104 that is in the vicinity of N number of nodes 104 with coordinates $(x_i, y_i)$, i=1 . . . N, the nodes 104 communicate and transmit their respective coordinate points. After receiving other nodes' coordinate points, the detecting node 104 may estimate its own location as a centroid of those points. The centroid of the node's 104 coordinates may be calculated as follows:

$$(\hat{x}, \hat{y}) = \left( \frac{1}{N} \sum_{i=1}^{N} x_i, \frac{1}{N} \sum_{i=1}^{N} y_i \right) \qquad \text{Eq. 2}$$

The centroid algorithm is a nonlocalized distributed scheme where the detecting node 104 needs to be in the vicinity of N number of nodes 104. Iterative node propagation may be necessary if, initially, no nodes exists in the vicinity of the detecting node 104.

As depicted in FIG. 2, the Cartesian coordinates of the nodes 104 including the detecting node 104, the malicious node 104-6 and any neighboring nodes 104 may be identified using the above-described DV-Hop algorithm, APIT algorithm, the centroid algorithm, other algorithms, and combinations thereof. It is noted that the malicious node 104-6, acting as a black hole node, may broadcast false routing information resulting in the coordinates of the malicious node 104-6 being incorrect as well. Any nodes 104 downstream from the malicious node 104-6 will also have incorrect routing and coordinate information since their respective coordinates are dependent from the incorrect coordinates of the malicious node 104-6. However, within the WSN 100, a number of nodes 104 downstream from the malicious node 104-6 may be able to communicatively reach other nodes 104 not dependent from the malicious node 104-6 such as, for example, node 104-13, node 104-11, node 104-7, node 104-9, and 104-N. For example, node 104-3 may be able to communicate with node 104-13, node 104-11, and node 104-7. Similarly, node 104-8 may be able to communicate with node 104-7, node 104-9, and 104-N. Thus, once, the locations of the nodes 104 have been determined, the detecting node 104 may calculate the coordinates of all its neighbors along with its own coordinates. The detecting node 104 may detect information from its neighbors such as a received signal strength indicator (RSSI), a time of arrival (ToA) value, a time difference of arrival (TDoA) value, an angle if arrival (AoA) value, a hop size, a hop number, the assigned rating or score of the node, and an ETX value, among other types of information.

Again, because it may be assumed that the number of malicious nodes (e.g., black hole nodes) within the WSN 100 is small, neighbors to the detecting node 104 are likely not malicious nodes. For example, node's 104-3 neighbors including node 104-13, node 104-11, and node 104-7 are likely not malicious. The case may be similarly true for the neighbors of node 104-1, node 104-2, node 104-4, node 104-5, and node 104-8. In FIG. 2, R is the radius of the coverage of the wireless communications of the nodes 104 defining a distance at which the nodes 104 may communicate with one another. The detecting node 104 may determine if its location is correct using the detected position of the malicious node 104-6 and the neighboring nodes 104. The following equation may be used by the detecting node 104 to determine the distance between the detecting node and the neighboring nodes 104 and malicious node 104-6.

$$d_{ij} = \sqrt{(x_i - x_j)^2 + (y_i - y_j)^2} \qquad \text{Eq. 3}$$

Because the malicious node 104-6 provides false information to the other nodes 104 including false coordinate or location information, the coordinates of the detecting node 104 are also incorrect as described above. Consequently, in an example where node 104-3 is the detecting node, detecting node 104-3 node may determine that the distance between the neighbor nodes 104 not affected by the black hole attack (e.g., not downstream from the malicious node 104-6) and itself may be larger than a distance threshold such as, for example, 2*R since node 104-3 is basing its location on the false coordinate information provided by the malicious node 104-6. Based on the physical topology depicted in FIG. 2, for example, it is clear that the detecting node 104-3 is within a communication range of, for example, node 104-13, node 104-11, and node 104-7. Assuming that the detecting node 104-3 knows that neighboring nodes are to be less than 2*R distance from itself as depicted in FIG. 2, the detecting node 104-3 can determine that the malicious node 104-6 is, in fact, a malicious, black hole node.

Although node 104-3 was used in the above example as the detecting node 104, any of node 104-1, node 104-2, node 104-4, node 104-5, and/or node 104-8 may be a detecting node. Essentially, any node 104 downstream from the malicious node 104-6 may act as a detecting node and discover directly or indirectly which node within the WSN is the malicious node 104-6.

Figure 3:
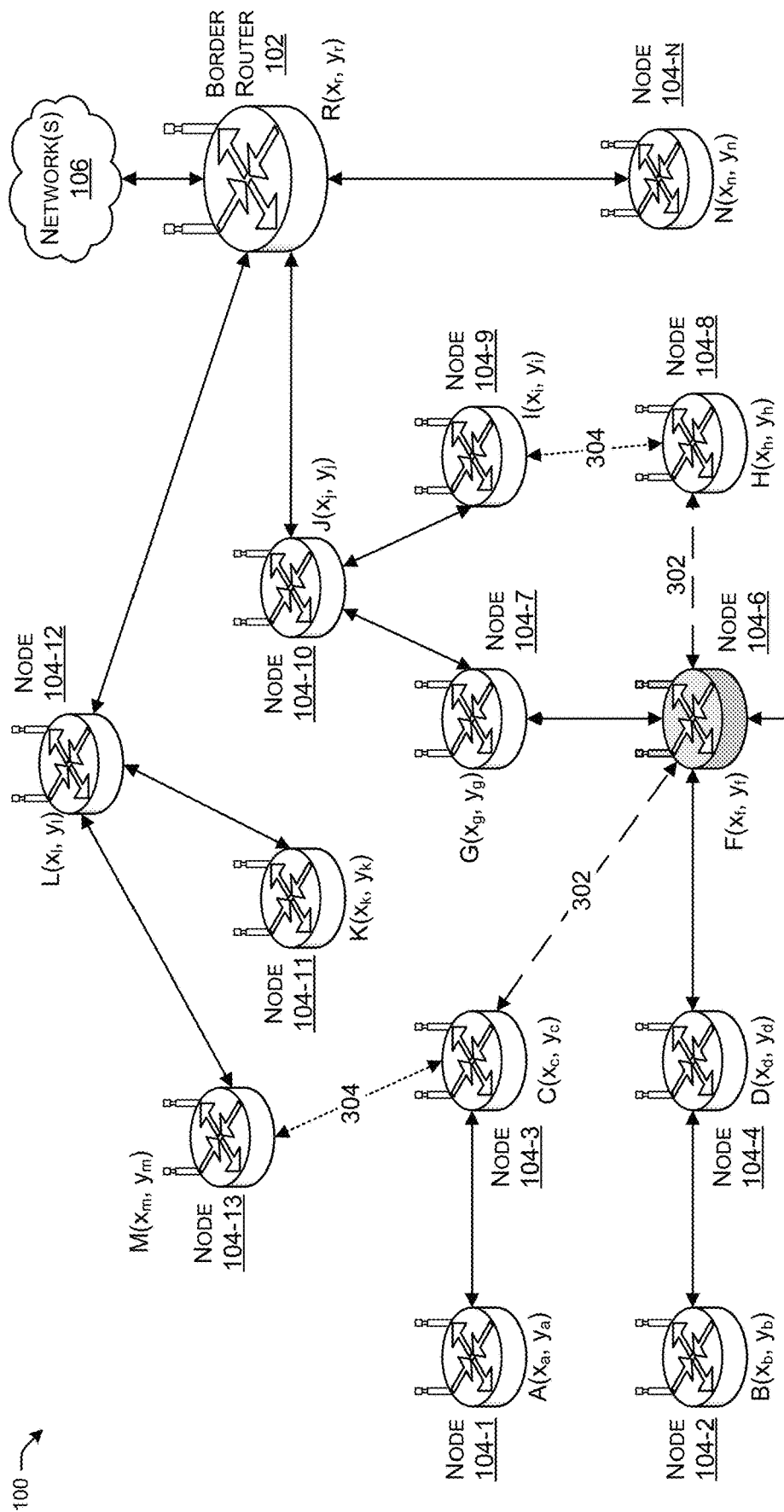
FIG. 3 illustrates a system-architecture diagram of an example WSN that is removing links to a malicious node and creating new links to other nodes at a first level, according to an example of the principles described herein.
Figure 4:
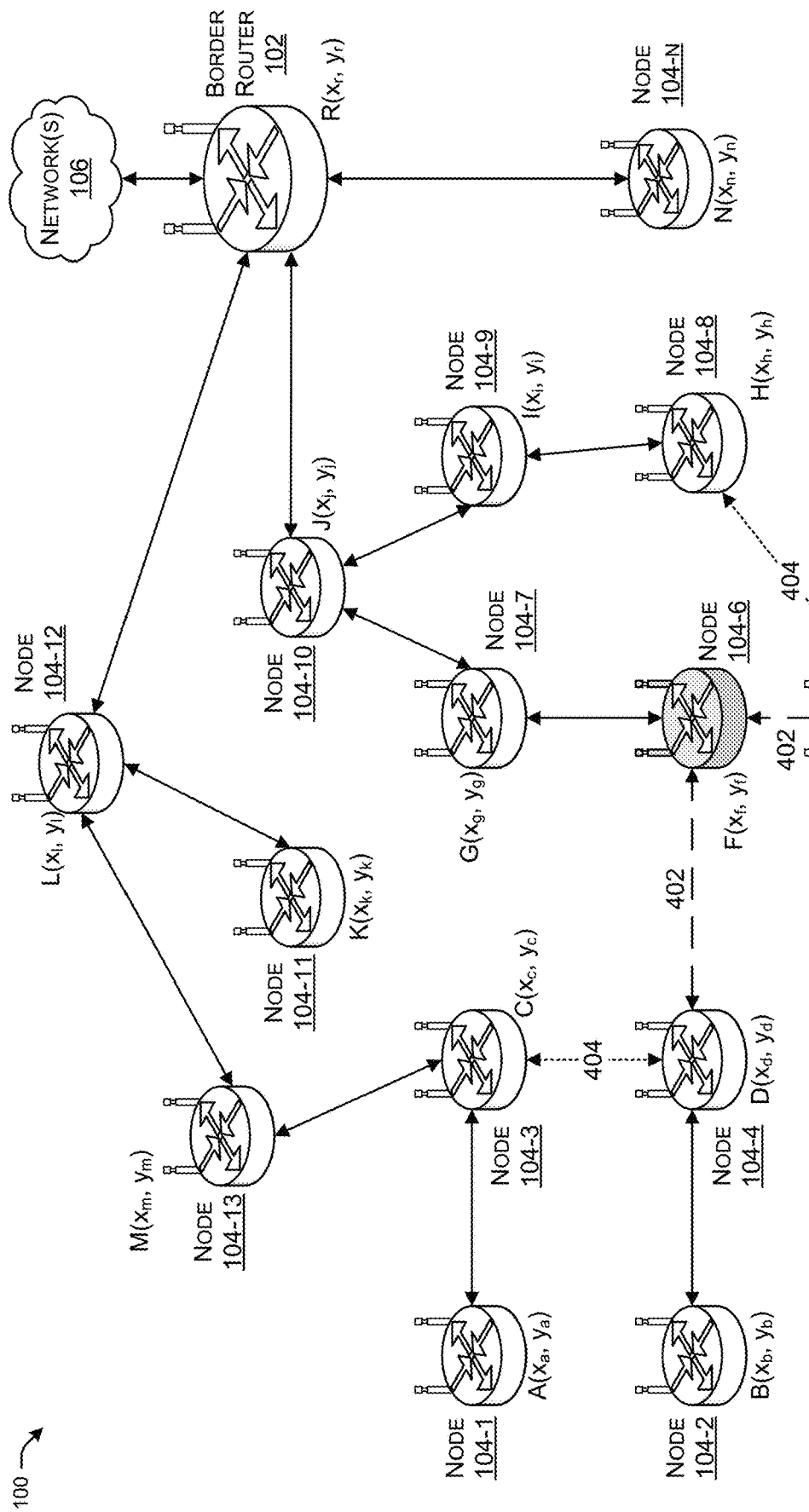
FIG. 4 illustrates a system-architecture diagram of an example WSN that is removing links to a malicious node and creating new links to other nodes at a second level, according to an example of the principles described herein.

Once the detecting node 104 has identified the malicious node 104-6, actions may be taken to circumvent the malicious node 104-6 such that the detecting node 104 and any of its child nodes no longer send data packets to the border router 102 via the malicious node 104-6. FIG. 3 illustrates a system-architecture diagram of the example WSN 100 that is removing links to the malicious node 1-4-6 and creating new links to other nodes 104 at a first level, according to an example of the principles described herein. FIG. 4 illustrates a system-architecture diagram of the example WSN 100 that is removing links to the malicious node 104-6 and creating new links to other nodes 104 at a second level, according to an example of the principles described herein. In order to circumvent the malicious node 104-6, the detecting node 104 may determine that because its parent node is the malicious node 104-6 (e.g., the blackhole node), the detecting node 104-3 may also assume that all other nodes within the WSN 100 are non-malicious nodes. Thus, the detecting node 104 may select a node 104 other than the malicious node 104-6 as a new parent node. In one example where node 104-3 is the detecting node, detecting node 104-3 may begin communications with one of node 104-13, node 104-11, or node 104-7 as its new parent node to replace the malicious node 104-6. Similarly, in an example where node 104-8 is the detecting node, detecting node 104-8 may begin communications with one of node 104-7, node 104-9, or node 104-N as its new parent node to replace the malicious node 104-6. The arrows 302 with the large dashes between the malicious node 104-6 and both node 104-3 and node 104-8 indicate that those links are being severed or removed such that node 104-3 and node 104-8 will no longer communicate with the malicious node 104-6. Further, arrows 304 with the small dashes between node 104-3 and node 104-13 indicate the selection of node 104-13 by node 104-3 as the new parent node to node 104-3 and beginning of communications between node 104-13 and node 104-3. Similarly, arrows 304 with the small dashes between node 104-8 and node 104-9 indicate the selection of node 104-9 by node 104-8 as the new parent node to node 104-8 and beginning of communications between node 104-9 and node 104-8. In this manner, a first layer of nodes may sever communication with the malicious node 104-6.

In a similar manner and as depicted in FIG. 4, second level nodes such as node 104-2, node 104-4, and node 104-5 may begin to sever communications with the malicious node 104-6 and create new communication links with other nodes 104 within the WSN 100. Because node 104-2, node 104-4, and node 104-5 are not neighbors to nodes 104 that are not downstream from the malicious node 104-6, node 104-2, node 104-4, and node 104-5 must rely on nodes 104 that themselves have stopped communicating with the malicious node 104-6. Thus, node 104-2, node 104-4, and node 104-5 may have to wait until nodes 104 such as node 104-3 and 104-8 first sever communication with the malicious node 104-6 and begin communications with non-downstream nodes 104 before node 104-2, node 104-4, and node 104-5 may be able to have a neighboring node that is not downstream from the malicious node 104-6. For example, node 104-4 may sever its communication link with the malicious node 104-6 as indicated by the arrow 402 with the large dashes between the malicious node 104-6 and node 104-4 and begin communication with node 104-3 as indicated by the arrow 404 with the small dashes between node 104-4 and 104-3. This is possible since node 104-3 is now a non-downstream node with respect to malicious node 104-6 and is a neighbor node relative to node 104-4. Similarly, node 104-5 may sever its communication link with the malicious node 104-6 as indicated by the arrow 402 with the large dashes between the malicious node 104-6 and node 104-5 and begin communication with node 104-8 as indicated by the arrow 404 with the small dashes between node 104-5 and 104-8. This is possible since node 104-8 is now a non-downstream node with respect to malicious node 104-6 and is a neighbor node relative to node 104-8.

In one example, as the nodes 104 downstream from the malicious node 104-6 sever communications with the malicious node 104-6 and begin communications with the non-downstream nodes 104, the rating or score the node 104 uses to identify the malicious node may begin to increase. In one example, once a node 104 downstream from the malicious node 104-6 changes its parent node from the malicious node to the non-downstream node, the rating or score may be increased to the highest rating or score. In one example, once a node 104 downstream from the malicious node 104-6 changes its parent node from the malicious node to the non-downstream node, the rating or score may be incrementally increased as data packets are detected by the node 104 as having been properly relayed to the border router 102. The increases in the ratings or scores is indicative of fewer drops of data packets occurring and/or being detected in the WSN 100.

In one example, all the nodes 104 downstream from the malicious node 104-6 that have severed communications with the malicious node 104-6 and began communications with new parent nodes may broadcast information regarding the malicious node 104-6 to their neighbor nodes 104. In one example, the information regarding the malicious node 104-6 may include instructions to perform a check for the malicious node 104-6. In one example, the information regarding the malicious node 104-6 may be propagated through the WSN 100 to a central device such as the border router 102 or another device such as a software defined network (SDN) controller, a cloud device or another controlling device so that other operations may be taken to permanently remove the malicious node 104-6 from the WSN 100, perform network forensics for security purposes, and/or re-program the malicious to function as a non-malicious, black hole node but as a function part of the WSN 100, or combinations thereof.

Figure 5:
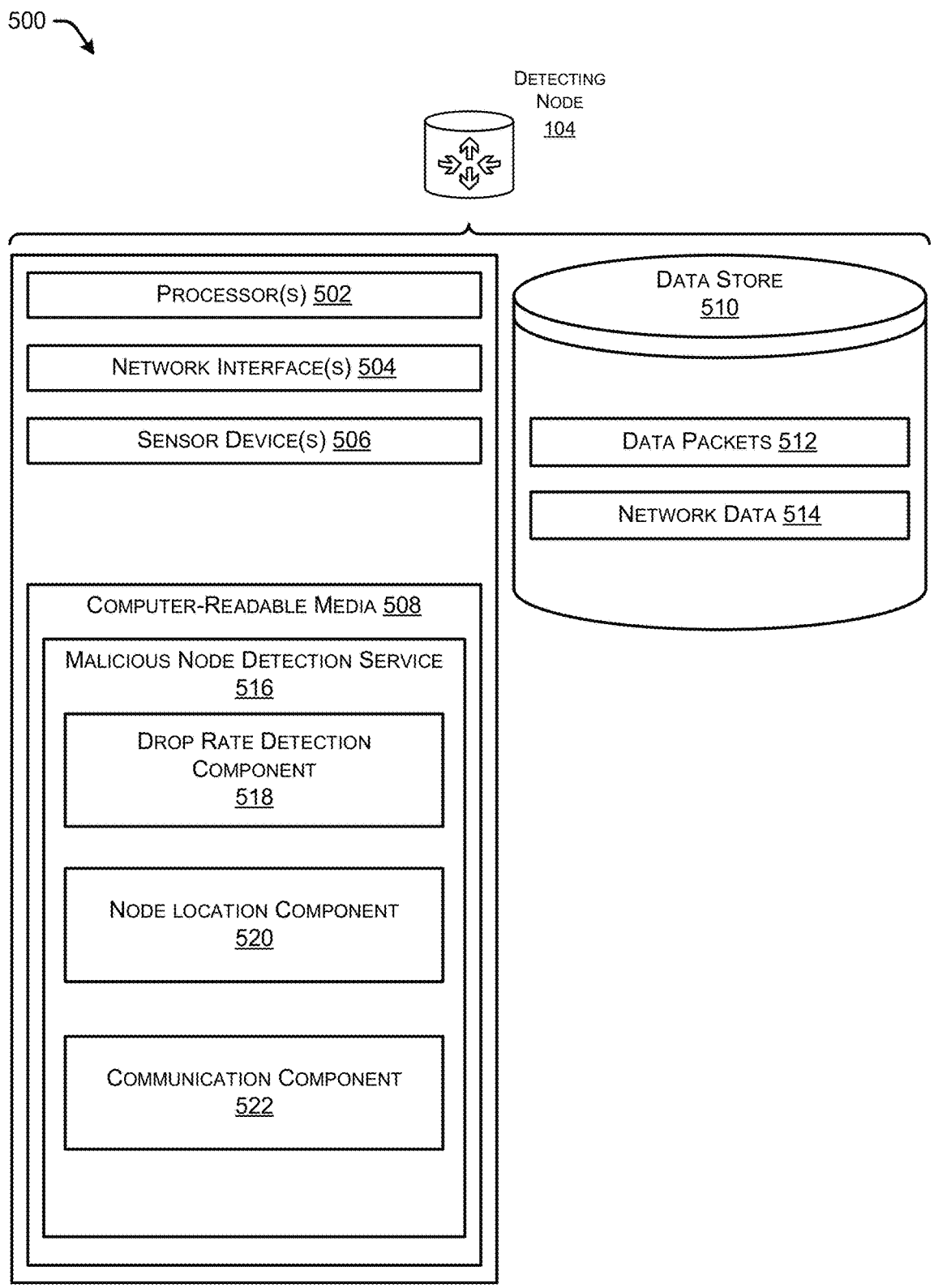
FIG. 5 is a component diagram of example components of a detecting node, according to an example of the principles described herein.

FIG. 5 is a component diagram 500 of example components of a detecting node 104, according to an example of the principles described herein. As illustrated, the detecting node 104 may include one or more hardware processor(s) 502, one or more devices, configured to execute one or more stored instructions. The processor(s) 502 may comprise one or more cores. Further, the detecting node 104 may include one or more network interfaces 504 configured to provide communications between the detecting node 104 and other devices, such as the nodes 104 within the WSN 100, the border router 102, and/or other systems or devices associated with the detecting node 104 and/or remote from the detecting node 104. The network interfaces 504 may include devices configured to couple to personal area networks (PANs), wired and wireless local area networks (LANs), wired and wireless wide area networks (WANs), and so forth. For example, the network interfaces 504 may include devices compatible with the wireless communication technologies and protocols described herein.

The detecting node 104 may also include at least one sensor device(s) 506 to sense at least one environmental event at the location where the detecting node 104 is physically located. The sensor device(s) 506 may include nay device capable of detecting the at least one environmental event, and examples are described herein.

The detecting node 104 may also include computer-readable media 508 that stores various executable components (e.g., software-based components, firmware-based components, etc.). In addition to various components discussed herein, the computer-readable media 508 may further store components to implement functionality described herein. While not illustrated, the computer-readable media 508 may store one or more operating systems utilized to control the operation of the one or more devices that comprise the detecting node 104. According to one example, the operating system comprises the LINUX operating system. According to another example, the operating system(s) comprise the WINDOWS SERVER operating system from MICROSOFT Corporation of Redmond, Wash. According to further examples, the operating system(s) may comprise the UNIX operating system or one of its variants. It may be appreciated that other operating systems may also be utilized.

Additionally, the detecting node 104 may include a data store 510 which may comprise one, or multiple, repositories or other storage locations for persistently storing and managing collections of data such as databases, simple files, binary, and/or any other data. The data store 510 may include one or more storage locations that may be managed by one or more database management systems. The data store 510 may store, for example, data packets 512 for distribution to upstream nodes 104 and the border router 102. The data packets 512 may include data defining at least one environmental event as sensed by the sensor device(s) 506 of the detecting node 104 within the WSN 100.

Further, the data store 510 may store network data 514. The network data 514 may include any data obtained by the detecting node 104 regarding a number of or rate of data packets dropped by an upstream node (e.g., the malicious node 104-6). Further the network data 514 may include a currently assigned rating or score of one or more nodes within the WSN 100 based on the number of or rate of data packets dropped by an upstream node. Still further, the network data 514 may include data regarding location information of a number of nodes 104 within the WSN 100, Cartesian coordinates of the number of nodes 104, RSSI data, ToA data, TDoA data, AoA data, hop sizes, hop numbers, and ETX values, among other data and types of data related to the processes described herein.

The computer-readable media 508 may store portions, or components, of a malicious node detection service 516 described herein. For instance, the malicious node detection service 516 of the computer-readable media 508 may include a drop rate detection component 518 to, when executed by the processor(s) 502, assign a highest rating or score to the nodes 104 within the WSN 100, track a rating or score of an upstream node from the detecting node 104 based on dropped data packets as described herein, and increase an assigned drop rate based on a detected decrease in dropped data packets.

The malicious node detection service 516 may also include a node location component 520 to, when executed by the processor(s) 502, obtain and/or calculate a physical and/or Cartesian coordinate location of the nodes within the WSN 100 utilizing at least one of the techniques described herein. The malicious node detection service 516 may also include a communication component 522 to, when executed by the processor(s) 502, sever a communication link with a malicious node 104-6 and create a new communication link with a new parent node.

Figure 6:
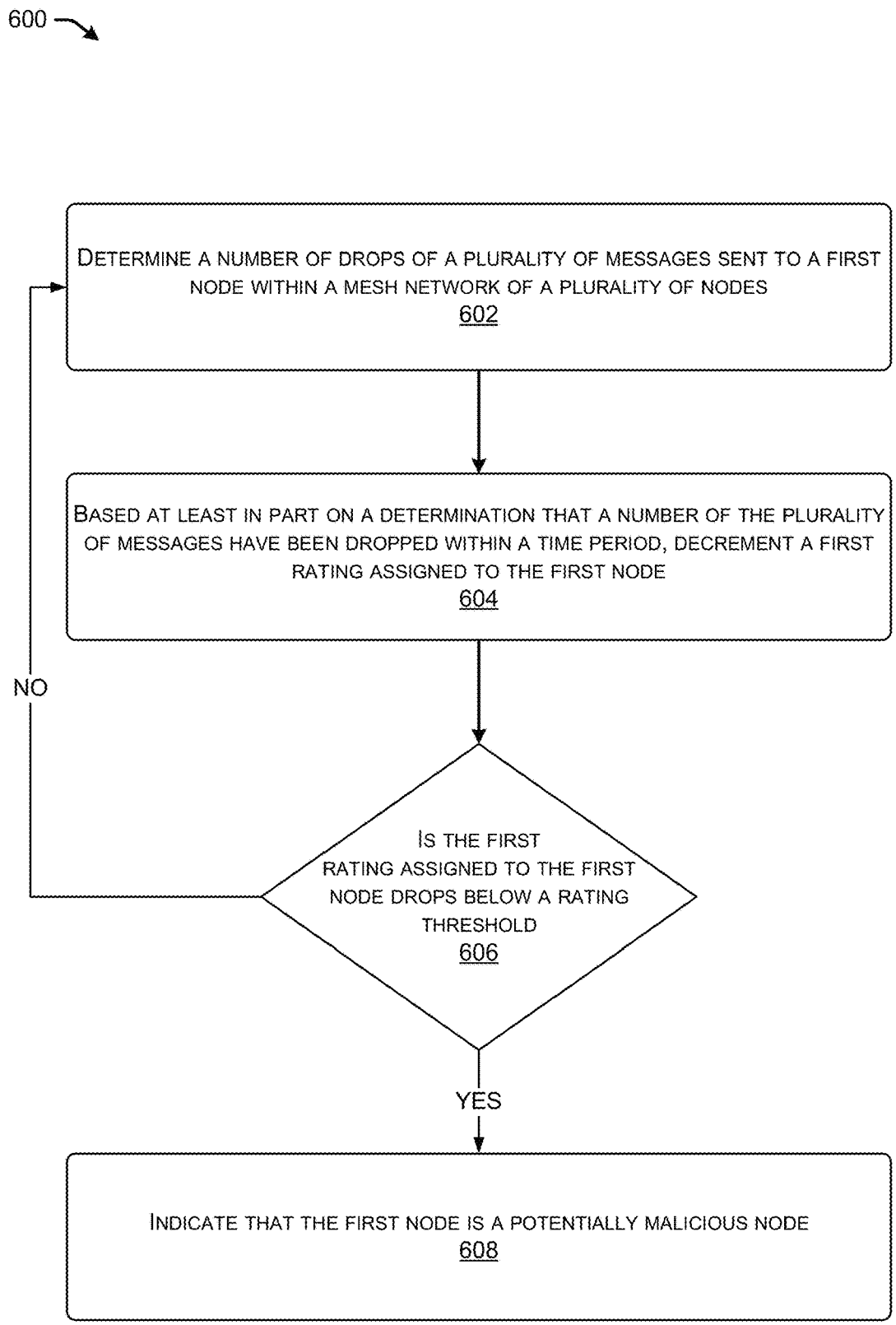
FIG. 6 illustrates a flow diagram of an example method for identifying a potentially malicious node in an WSN, according to an example of the principles described herein.

FIG. 6 illustrates a flow diagram of an example method 600 for identifying a potentially malicious node 104-6 in an WSN 100, according to an example of the principles described herein. The method 600 of FIG. 6 may include determining, at 602, a number of drops of a plurality of messages sent to a first node 104 within the mesh network (e.g., the WSN 100) of a plurality of nodes 104. The detecting node 104 may execute the drop rate detection component 518 of the malicious node detection service 516 in order to perform operation 602. Based at least in part on a determination that a number of the plurality of messages have been dropped within a time period, the detecting node 104 may decrement a first rating assigned to a first node (e.g., an upstream node such as the malicious node 104-6) at 604 by executing the drop rate detection component 518.

At 606, the method 600 further includes, with the detecting node 104, determining whether the first rating assigned to the first node drops below a rating threshold by, again, executing the drop rate detection component 518. Based at least in part on the detecting node 104 determining that the first rating assigned to the first node has not dropped below the rating threshold (606, determination NO), the method 600 may return to 602 where the method 600 begins again detecting the number of drops of the messages sent to the first node.

However, based at least in part on the detecting node 104 determining that the first rating assigned to the first node has dropped below the rating threshold (606, determination YES), the method 600 may include indicating that the first node is a potentially malicious node at 608. This allows the detecting node 104 to determine that a potentially malicious node exists upstream in preparation for identify which node upstream is actually the malicious node responsible for dropping the messages (e.g., data packets) and acting as the black hole node.

Figure 7:
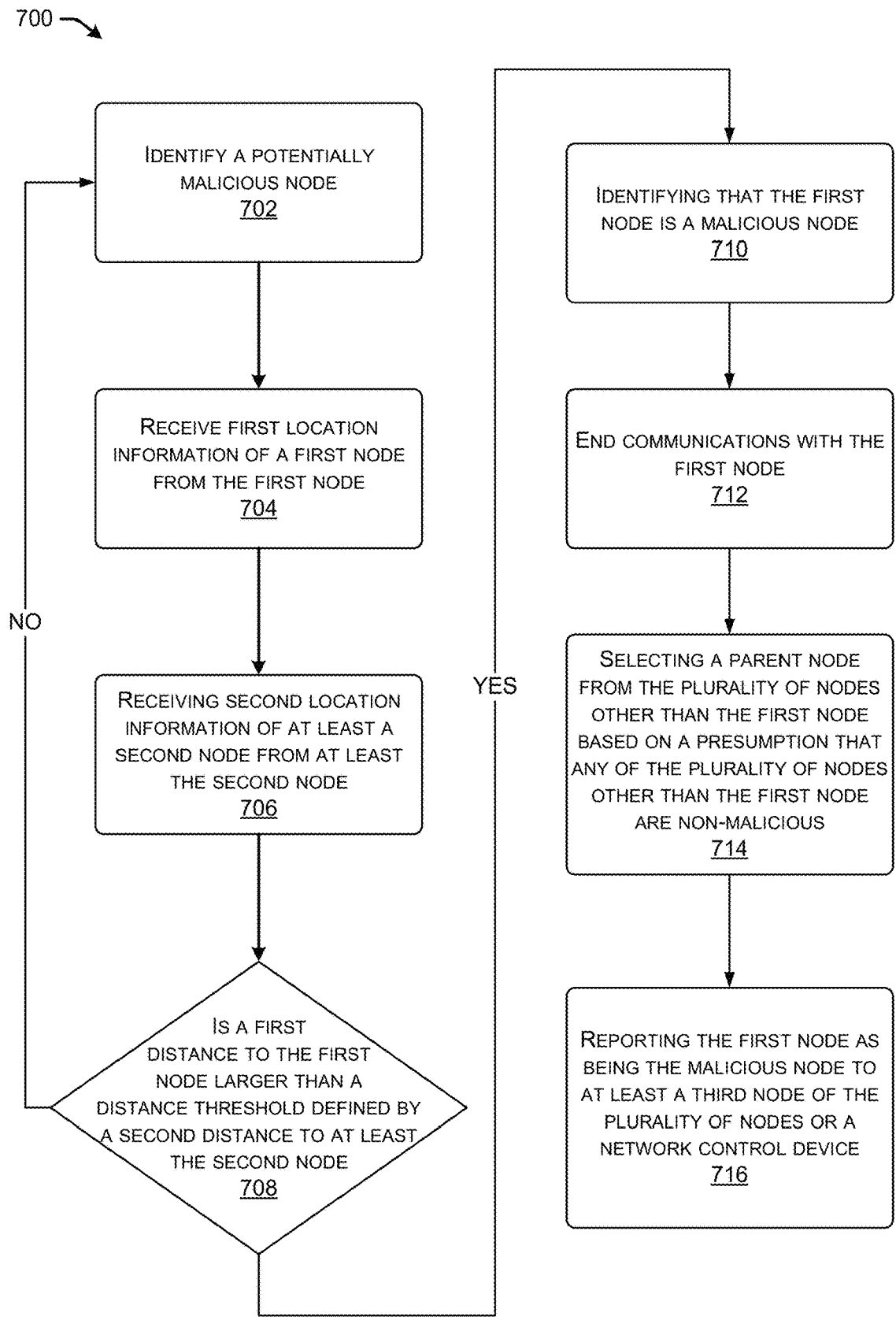
FIG. 7 illustrates a flow diagram of an example method for identifying a potentially malicious node in an WSN, according to an example of the principles described herein.

FIG. 7 illustrates a flow diagram of an example method 700 for identifying a potentially malicious node 104-6 in an WSN 100, according to an example of the principles described herein. The method 700 of FIG. 7 may include, at 702, identifying a potentially malicious node with a detecting node 104 among the plurality of nodes within the WSN 100. In one example, the method 600 of FIG. 6 may be used to perform operation 702.

At 704, first location information may be received information of a first node from the first node by the detecting node 104 executing the node location component 220 of the malicious node detection service 516. In one example, the first node may include the malicious node 104-6 identified as the potentially malicious node in operation 702. Similarly, at 706 and by executing the node location component 220, second location information may be received by the detecting node 104 from at least a second node from the at least second node. The operation of 706 may include receiving location information from a plurality of nodes 104 upstream from the malicious node 104-6, nodes downstream from the detecting node 104, nodes the neighbor the detecting node 104, and combinations thereof.

The detecting node 104 may determine whether a first distance to the first node is larger than a distance threshold defined by a second distance to at least the second node (e.g., any other node 104 within the WSN 100) at 708. Based at least in part on a determination that the first distance to the first node is not larger than a distance threshold defined by a second distance to at least the second node (708, determination NO), then the method may loop back to operation 702. However, response to a determination that the first distance to the first node is larger than a distance threshold defined by a second distance to at least the second node (708, determination YES), then the first node may be identified as the malicious node 104-6 at 710.

In order to correct the effects of the malicious node 104-6, the method 700 may further include, at 712, ending communications with the first node (e.g., the malicious node 104-6) via execution of the communication component 522 of the detecting node 104. At 714, the detecting node 104 may execute the communication component 522 to also select a new parent node from the plurality of nodes 104 other than the first node (e.g., the malicious node 104-6) based on a presumption that any of the plurality of nodes 104 other than the first node are non-malicious. Further, at 716, by executing the communication component 522 of the malicious node detection service 516, the detecting node 104 may report the first node as being the malicious node to at least a third node 104 of the plurality of nodes 104 or a network control device such as, for example, the border router 102.

Figure 8:
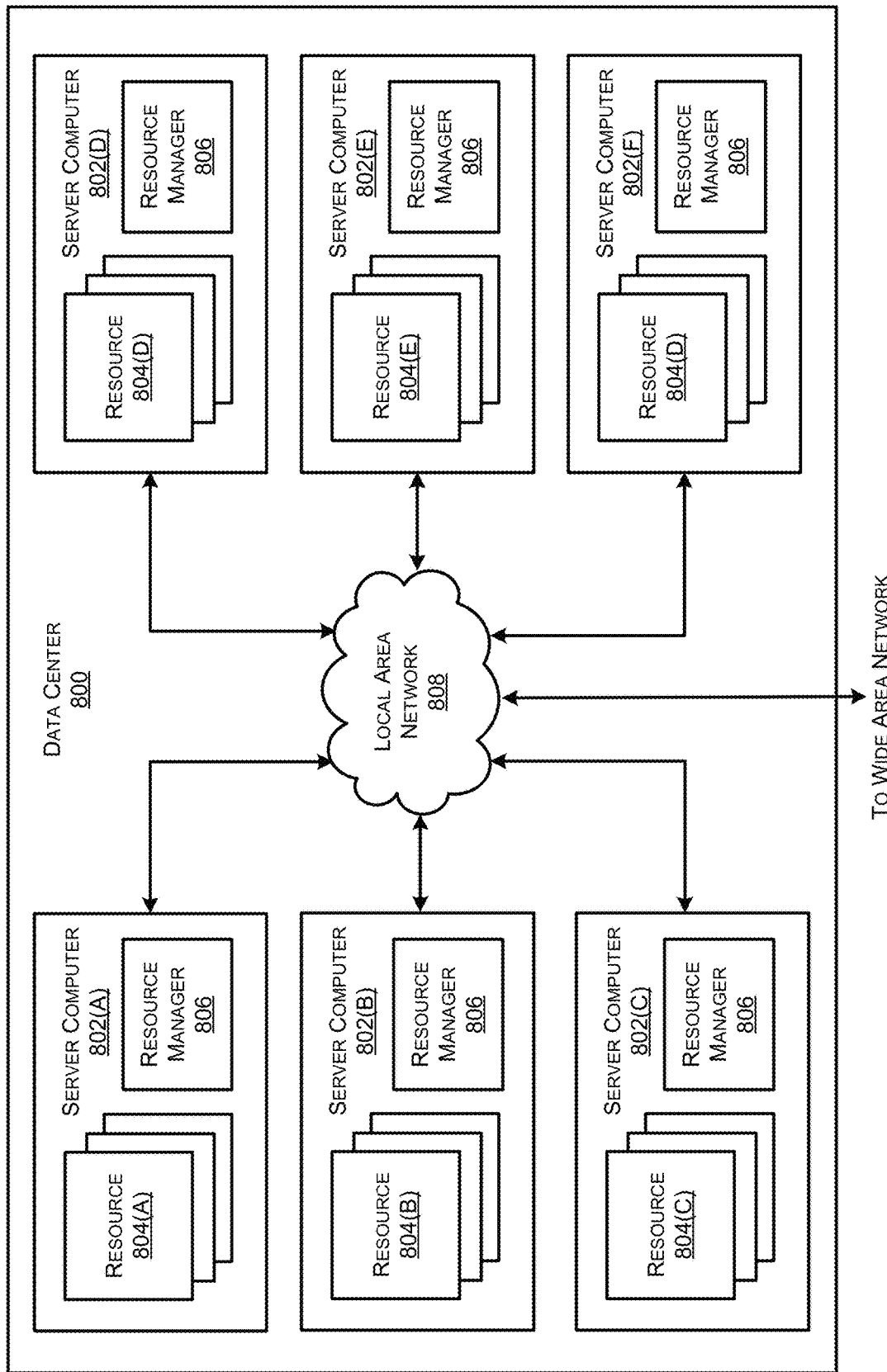
FIG. 8 illustrates a computing system diagram illustrating a configuration for a data center that can be utilized to implement aspects of the technologies disclosed herein.

FIG. 8 illustrates a computing system diagram illustrating a configuration for a data center 800 that can be utilized to implement aspects of the technologies disclosed herein. The example data center 800 shown in FIG. 8 includes several server computers 802A-802F (which might be referred to herein singularly as "a server computer 802" or in the plural as "the server computers 802) for providing computing resources. In some examples, the resources and/or server computers 802 may include, or correspond to, the any type of networked device described herein. Although described as servers, the server computers 802 may comprise any type of networked device, such as servers, switches, routers, hubs, bridges, gateways, modems, repeaters, access points, etc.

The server computers 802 can be standard tower, rackmount, or blade server computers configured appropriately for providing computing resources. In some examples, the server computers 802 may provide computing resources 804 including data processing resources such as VM instances or hardware computing systems, database clusters, computing clusters, storage clusters, data storage resources, database resources, networking resources, virtual private networks (VPNs), and others. Some of the servers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 800 can also be configured to provide network services and other types of services.

In the example data center 800 shown in FIG. 8, an appropriate LAN 808 is also utilized to interconnect the server computers 802A-802F. It may be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 800, between each of the server computers 802A-802F in each data center 800, and, potentially, between computing resources in each of the server computers 802. It may be appreciated that the configuration of the data center 800 described with reference to FIG. 8 is merely illustrative and that other implementations can be utilized.

In some examples, the server computers 802 and or the computing resources 804 may each execute/host one or more tenant containers and/or virtual machines to perform techniques described herein.

In some instances, the data center 800 may provide computing resources, like tenant containers, VM instances, VPN instances, and storage, on a permanent or an as-needed basis. Among other types of functionality, the computing resources provided by a cloud computing network may be utilized to implement the various services and techniques described above. The computing resources 804 provided by the cloud computing network can include various types of computing resources, such as data processing resources like tenant containers and VM instances, data storage resources, networking resources, data communication resources, network services, VPN instances, and the like.

Each type of computing resource 804 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 804 not mentioned specifically herein.

The computing resources 804 provided by a cloud computing network may be enabled in one example by one or more data centers 800 (which might be referred to herein singularly as "a data center 800" or in the plural as "the data centers 800). The data centers 800 are facilities utilized to house and operate computer systems and associated components. The data centers 800 typically include redundant and backup power, communications, cooling, and security systems. The data centers 800 can also be located in geographically disparate locations. One illustrative example for a data center 800 that can be utilized to implement the technologies disclosed herein will be described below with regard to FIG. 9.

Figure 9:
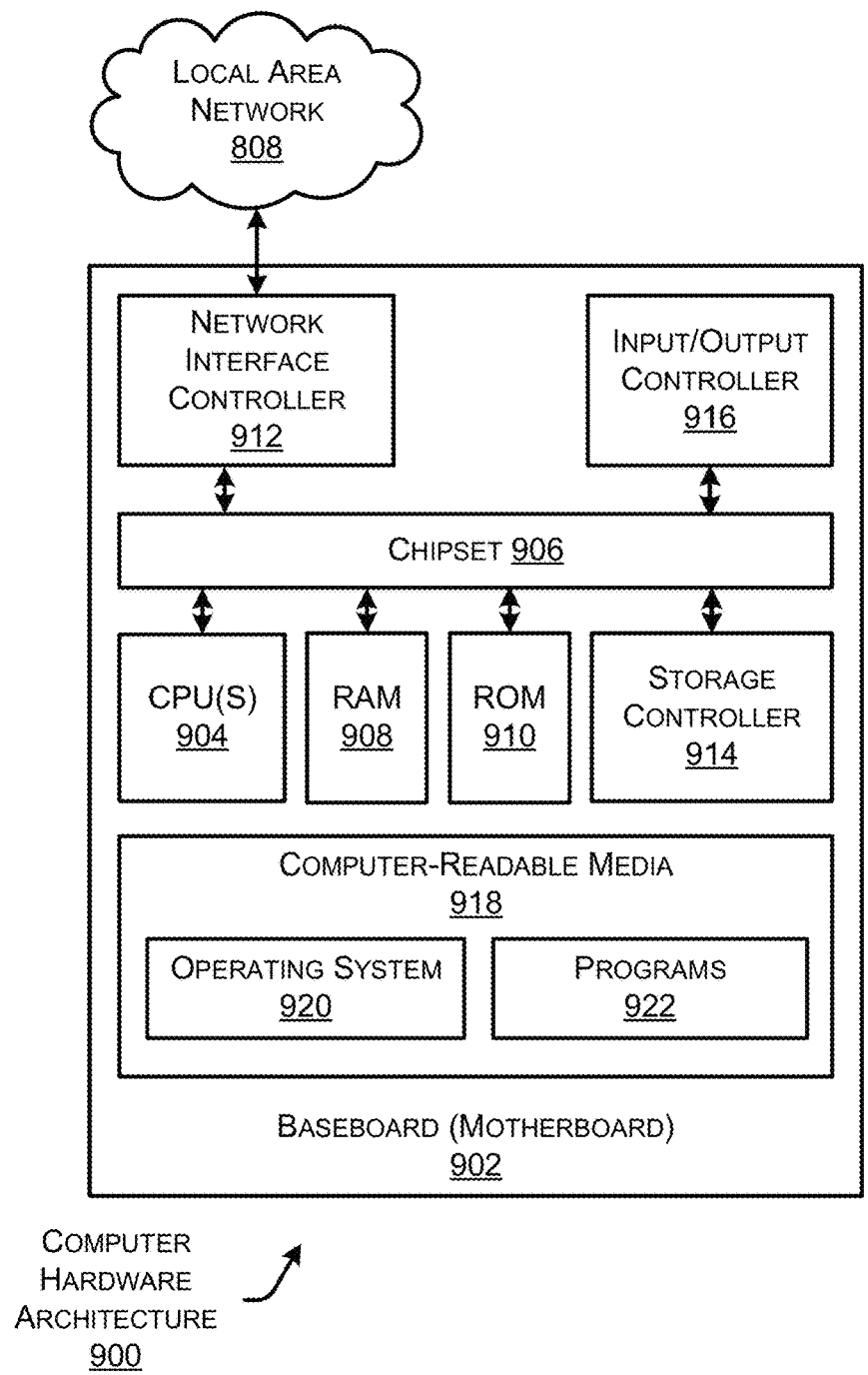
FIG. 9 illustrates a computer architecture diagram showing an example computer hardware architecture for implementing a computing device that can be utilized to implement aspects of the various technologies presented herein.

FIG. 9 illustrates a computer architecture diagram showing an example computer hardware architecture 900 for implementing a computing device that can be utilized to implement aspects of the various technologies presented herein. The computer hardware architecture 900 shown in FIG. 9 illustrates a server computer 802, network device (e.g., border router 102, node 104, load balancer, data store, etc.), workstation, desktop computer, laptop, tablet, network appliance, e-reader, smartphone, or other computing device, and can be utilized to execute any of the software components presented herein. The computer 900 may, in some examples, correspond to a network device (e.g., the border router 102 and/or the nodes 104) described herein, and may comprise networked devices such as servers, switches, routers, hubs, bridges, gateways, modems, repeaters, access points, etc.

The computer 900 includes a baseboard 902, or "motherboard," which is a printed circuit board to which a multitude of components or devices can be connected by way of a system bus or other electrical communication paths. In one illustrative configuration, one or more central processing units (CPUs) 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory (ROM) 910 or non-volatile RAM (NVRAM) for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the WSN 100. The chipset 906 can include functionality for providing network connectivity through a Network Interface Controller (NIC) 912, such as a gigabit Ethernet adapter. The NIC 912 is capable of connecting the computer 900 to other computing devices over the WSN 100. It may be appreciated that multiple NICs 912 can be present in the computer 900, connecting the computer to other types of networks and remote computer systems. In some examples, the NIC 912 may be configured to perform at least some of the techniques described herein, such as packet redirects and/or other techniques described herein.

The computer 900 can be connected to a storage device 918 that provides non-volatile storage for the computer. The storage device 918 can store an operating system 920, programs 922, and data, which have been described in greater detail herein. The storage device 918 can be connected to the computer 900 through a storage controller 914 connected to the chipset 906. The storage device 918 can consist of one or more physical storage units. The storage controller 914 can interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 900 can store data on the storage device 918 by transforming the physical state of the physical storage units to reflect the information being stored. The specific transformation of physical state can depend on various factors, in different examples of this description. Examples of such factors can include, but are not limited to, the technology used to implement the physical storage units, whether the storage device 918 is characterized as primary or secondary storage, and the like.

For example, the computer 900 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the storage device 918 by detecting the physical states or characteristics of one or more particular locations within the physical storage units.

In addition to the storage device 918 described above, the computer 900 can have access to other computer-readable storage media to store and retrieve information, such as program modules, data structures, or other data. It may be appreciated by those skilled in the art that computer-readable storage media is any available media that provides for the non-transitory storage of data and that can be accessed by the computer 900. In some examples, the operations performed by the WSN 100 and or any components included therein, may be supported by one or more devices similar to computer 900. Stated otherwise, some or all of the operations performed by the WSN 100, and or any components included therein, may be performed by one or more computer devices 900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the computer 900. According to one example, the operating system 920 comprises the LINUX operating system. According to another example, the operating system comprises the WINDOWS® SERVER operating system from MICROSOFT Corporation of Redmond, Wash. According to further examples, the operating system can comprise the UNIX operating system or one of its variants. It may be appreciated that other operating systems can also be utilized. The storage device 918 can store other system or application programs and data utilized by the computer 900.

In one example, the storage device 918 or other computer-readable storage media is encoded with computer-executable instructions which, when loaded into the computer 900, transform the computer from a general-purpose computing system into a special-purpose computer capable of implementing the examples described herein. These computer-executable instructions transform the computer 900 by specifying how the CPUs 904 transition between states, as described above. According to one example, the computer 900 has access to computer-readable storage media storing computer-executable instructions which, when executed by the computer 900, perform the various processes described above with regard to FIGS. 1-7. The computer 900 can also include computer-readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

As described herein, the computer 900 may comprise one or more of a border router 102, a node 104, or a network device (e.g., server computer 802, computing resource, router, etc.). The computer 900 may include one or more hardware processor(s) such as the CPUs 904 configured to execute one or more stored instructions. The CPUs 904 may comprise one or more cores. Further, the computer 900 may include one or more network interfaces configured to provide communications between the computer 900 and other devices, such as the communications described herein as being performed by the nodes 104 and border router 102 The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 922 may comprise any type of programs or processes to perform the techniques described in this disclosure for determining connectivity in multi-hop paths using BFD Echo packet(s). The programs 922 may enable the nodes 104 and/or the border router 102 to perform various operations.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative some examples that fall within the scope of the claims of the application.

What is claimed is:

1. A device comprising:
one or more processors; and
one or more non-transitory computer-readable media storing instructions that, when executed by the one or more processors, cause the one or more processors to perform operations comprising:
assigning a first rating to a plurality of nodes within a mesh network;
determining a number of drops of a plurality of messages sent to a first node of the plurality of nodes;
determining that the number of drops of the plurality of messages exceeds a threshold number of drops for a time period;
based at least in part on the number of drops of the plurality of messages exceeding the threshold number of drops for the time period, decrementing the first rating assigned to the first node to a second rating assigned to the first node;
determining that the second rating assigned to the first node is below a rating threshold;
based at least in part on the second rating being below the rating threshold, determining that the first node is a potentially malicious node;
receiving first location information indicating a first location of the first node;
receiving second location information indicating a second location of a second node;
determining a distance threshold based at least in part on a second distance determined using the second location information;
determining, using the first location information, that a first distance to the first node is greater than or equal to the distance threshold; and
based at least in part on the first distance to the first node being larger than the distance threshold, identifying that the first node is a malicious node.

2. The device of claim 1, the operations further comprising:
ending communications with the first node; and
selecting a parent node from the plurality of nodes other than the first node based on a presumption that any of the plurality of nodes other than the first node are non-malicious.

3. The device of claim 2, the operations further comprising reporting the first node as being the malicious node to at least a third node of the plurality of nodes or a network control device.

4. The device of claim 1, wherein the mesh network is a wireless network, a wireless mesh network, or a wireless sensor network.

5. The device of claim 1, the operations further comprising:
determining that an intermediary node exists within a network route to the first node; and
based at least in part on a determination that the intermediary node exists within the network route to the first node, instructing the intermediary node to perform the operations of claim 1.

6. The device of claim 1, wherein the distance threshold is at least two times a radius of a wireless communication distance of at least the second node.

7. A method comprising:
determining a number of drops of a plurality of messages sent to a first node within a mesh network of a plurality of nodes;
based at least in part on a determination that a number of the plurality of messages have been dropped within a time period, decrementing a first rating assigned to the first node to a second rating;
determining that the second rating assigned to the first node is below a rating threshold;
based at least in part on the second rating being below the rating threshold, determining that the first node is a potentially malicious node,
receiving first location information indicating a first location of the first node;
receiving second location information indicating a second location of a second node;

determining a distance threshold based at least in part on a second distance determined using the second location information;

determining, using the first location information, that a first distance to the first node is greater than or equal to the distance threshold; and based at least in part on the first distance to the first node being larger than the distance threshold, identifying that the first node is a malicious node.

8. The method of claim 7, further comprising:

ending communications with the first node; and selecting a parent node from the plurality of nodes other than the first node based on a presumption that any of the plurality of nodes other than the first node are non-malicious.

9. The method of claim 8, further comprising reporting the first node as being the malicious node to at least a third node of the plurality of nodes or a network control device.

10. The method of claim 7, further comprising:

determining that an intermediary node exists within a network route to the first node; and based at least in part on a determination that an intermediary node exists within the network route to the first node, instructing the intermediary node to perform the method of claim 8.

11. The method of claim 7, wherein the distance threshold is two times a radius of a wireless communication distance of at least the second node.

12. The method of claim 7, wherein the first location information and the second location information are determined via at least one of a distance vector-hop (DV-Hop) algorithm, an approximate point in triangulation (APIT) algorithm, or a centroid localization algorithm.

13. A non-transitory computer-readable medium storing instructions that, when executed, cause one or more processors to perform operations, comprising:

determining a number of drops of a plurality of messages sent to a first node of a plurality of nodes;

determining that the number of drops of the plurality of messages exceeds a threshold number of drops for a time period;

based at least in part on the number of drops of the plurality of messages exceeding the threshold number of drops for the time period, decrementing a first rating assigned to the first node to a second rating assigned to the first node;

determining that the second rating assigned to the first node is below a rating threshold; and based at least in part on the second rating being below the rating threshold, determining that the first node is a potentially malicious node;

sending a first request to the first node for first location information of the first node;

sending a second request to at least a second node for second location information of at least the second node;

receiving the first location information of the first node from the first node;

receiving the second location information of at least the second node from at least the second node;

determining a first distance to the first node and a distance threshold defined by a second distance to at least the second node; and based at least in part on a determination that the first distance to the first node is larger than the distance threshold, identifying that the first node is a malicious node.

14. The non-transitory computer-readable medium of claim 13, wherein the distance threshold is at least two times a radius of a wireless communication distance of at least the second node.

15. The non-transitory computer-readable medium of claim 13, the operations further comprising:

ending communications with the first node; and selecting a parent node from the plurality of nodes other than the first node based on a presumption that any of the plurality of nodes other than the first node are non-malicious.

16. The non-transitory computer-readable medium of claim 13, the operations further comprising:

determining that an intermediary node exists within a network route to the first node; and based at least in part on a determination that the intermediary node exists within the network route to the first node, instructing the intermediary node to perform the operations of claim 1.

17. The non-transitory computer-readable medium of claim 13, the operations further comprising reporting the first node as being the malicious node to at least a third node of the plurality of nodes or a network control device.

18. The non-transitory computer-readable medium of claim 13, wherein:

the plurality of nodes include sensory devices within a mesh network to sense at least one environmental event at locations where the plurality of nodes are located; and the mesh network includes a low-power and lossy network (LLN).

* * * * *